(12) United States Patent
Um et al.

(10) Patent No.: US 7,499,129 B2
(45) Date of Patent: Mar. 3, 2009

(54) THIN FILM TRANSISTOR ARRAY PANEL AND LCD HAVING PLURAL RED, GREEN AND BLUE PIXELS IN WHICH EACH COLOR PIXEL INCLUDES FIRST AND SECOND SUBPIXEL ELECTRODES HAVING DIFFERENT VOLTAGE/AREA RATIOS WITH RESPECT TO EACH OTHER AND FOR EACH COLOR PIXEL

(75) Inventors: Yoon-Sung Um, Yongin-si (KR); Jong-Ho Son, Seoul (KR); Dong-Hoon Chung, Suwon-si (KR); Jun-Woo Lee, Anyang-si (KR); Yong-Hwan Shin, Suwon-si (KR); Jae-Jin Lyu, Gyeonggi-do (KR); Hak-Sun Chang, Seoul (KR); Hyun-Wuk Kim, Yongin-si (KR); Chang-Hun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 226 days.

(21) Appl. No.: 11/195,779

(22) Filed: Aug. 3, 2005

(65) Prior Publication Data
US 2006/0028589 A1 Feb. 9, 2006

(30) Foreign Application Priority Data
Aug. 4, 2004 (KR) ........................ 10-2004-0061397
Feb. 18, 2005 (KR) ........................ 10-2005-0013458

(51) Int. Cl.
G02F 1/1335 (2006.01)
(52) U.S. Cl. .................... 349/109; 349/108; 349/144
(58) Field of Classification Search .................. 349/38, 349/44, 106–109, 144
See application file for complete search history.

(56) References Cited

U.S. PATENT DOCUMENTS
4,902,103 A 2/1990 Miyake et al.
(Continued)

FOREIGN PATENT DOCUMENTS
EP 0 685 756 12/1995
(Continued)

OTHER PUBLICATIONS
European Search Report; Application No. EP 05 10 7132; Date of completion of search: Dec. 9, 2005 (6 pages).
(Continued)

Primary Examiner—David Nelms
Assistant Examiner—John Heyman
(74) Attorney, Agent, or Firm—Cantor Colburn LLP

(57) ABSTRACT

The invention provides a LCD including an insulating substrate; a plurality of first signal lines formed on the insulating substrate; a plurality of second signal lines crossing and insulated from the first signal lines; a plurality of thin film transistors (TFT) coupled with the first and second signal lines; and a plurality of pixels including a plurality of first sub-pixel electrodes coupled with the TFTs and a plurality of second sub-pixel electrodes capacitively coupled with the first sub-pixel electrodes, wherein the pixels include a red (R) pixel, a green (G) pixel, and a blue (B) pixel and a voltage ratio or an area ratio of the second sub-pixel electrode with respect to the first sub-pixel electrode is different among the R, G, and B pixels to improve a brightness ratio of R, G, and B components at a lateral position.

6 Claims, 12 Drawing Sheets

U.S. PATENT DOCUMENTS

| | | | | |
|---|---|---|---|---|
| 5,126,865 | A | * | 6/1992 | Sarma .................. 349/85 |
| 6,100,861 | A | * | 8/2000 | Cohen et al. ............ 345/88 |
| 7,113,233 | B2 | * | 9/2006 | Lyu .................... 349/38 |
| 2006/0274219 | A1 | * | 12/2006 | Lyu .................... 349/38 |

FOREIGN PATENT DOCUMENTS

| | | | |
|---|---|---|---|
| JP | 05289108 | A * | 11/1993 |
| JP | 08 201777 | | 8/1996 |
| JP | 09 269509 | | 10/1997 |
| JP | 10 115820 | | 5/1998 |
| JP | 2004102209 | | 4/2004 |
| KR | 1019990080465 | | 11/1999 |
| KR | 1998084238 | | 12/1999 |
| KR | 1019990084238 | | 12/1999 |
| KR | 1020030069848 | | 8/2003 |
| KR | 1020030095260 | | 12/2003 |

OTHER PUBLICATIONS

Extended European Search Report for application No. 07114779.7-2205 dated Oct. 26, 2007.

* cited by examiner

THIN FILM TRANSISTOR ARRAY PANEL AND LCD HAVING PLURAL RED, GREEN AND BLUE PIXELS IN WHICH EACH COLOR PIXEL INCLUDES FIRST AND SECOND SUBPIXEL ELECTRODES HAVING DIFFERENT VOLTAGE/AREA RATIOS WITH RESPECT TO EACH OTHER AND FOR EACH COLOR PIXEL

CROSS REFERENCE TO RELATED APPLICATIONS

This application claims priority to and the benefit of Korean Patent Application No. 10-2004-0061397, filed on Aug. 4, 2004, and Korean Patent Application No. 10-2005-0013458, filed on Feb. 18, 2005, which are hereby incorporated by reference for all purposes as if fully set forth herein.

BACKGROUND OF THE INVENTION

1. Field of the Invention

The present invention relates to a liquid crystal display and a thin film transistor array panel.

2. Description of the Related Art

A liquid crystal display (LCD) is a common type of flat panel display. An LCD includes two panels provided with field-generating electrodes, and a liquid crystal (LC) layer interposed therebetween. The LCD displays images by applying voltages to the field-generating electrodes to generate an electric field in the LC layer, which changes orientations of LC molecules in the LC layer to adjust polarization of incident light.

A disadvantage of the LCD is that it has a relatively narrow viewing angle. Various techniques for enlarging the viewing angle have been suggested, such as utilizing a vertically aligned LC and providing cutouts or protrusions at field-generating electrodes such as pixel electrodes and a common electrode.

For example, when the pixel electrodes and a common electrode respectively have cutouts, the cutouts induce a slanted electric field, and the slanted electric field controls falling directions of liquid crystals. Control of the falling direction of liquid crystals makes it possible to widen the viewing angle of liquid crystal display.

For example, when the pixel electrodes and the common electrode respectively have protrusions, the protrusions are formed on both of pixel electrodes and a common electrode, the protrusions induce a slanted electric field, and the slanted electric field controls falling directions of liquid crystals.

Additional methods in which pixel electrodes have cutouts and protrusions formed on a common electrode may be used to control falling directions of liquid crystals.

An LCD using cutouts or protrusions has a viewing angle of greater than approximately 80 degrees in any direction, which has an improved contrast ratio in view of a standard contrast ratio of 1:10, and in view of gray scale inversion where a viewing angle of occurring brightness inversion is a standard angle. However, such an LCD shows poor visibility that is inferior to a twisted nematic mode LCD. The poor visibility is caused by discordance of the gamma curve between the front view and lateral view.

For example, in a vertically aligned mode LCD using cutouts, as the viewing angle increases, the picture plane becomes brighter and the color shifts toward white. When this phenomenon is excessive, the image distorts because the brightness difference between gray scales disappears.

SUMMARY OF THE INVENTION

The present invention provides an LCD having a high transmittance ratio and a small difference in color tone between a front view and a lateral view.

Additional features of the invention will be set forth in the description which follows, and in part will be apparent from the description, or may be learned by practice of the invention.

The present invention discloses a liquid crystal display, including an insulating substrate; a plurality of first signal lines formed on the insulating substrate; a plurality of second signal lines crossing the first signal lines and insulated from the first signal lines; a plurality of thin film transistors coupled with the first signal lines and the second signal lines; and a plurality of pixels including a plurality of first sub-pixel electrodes coupled with the thin film transistors and a plurality of second sub-pixel electrodes capacitively coupled with the first sub-pixel electrodes, wherein a voltage ratio of the second sub-pixel electrode with respect to the first sub-pixel electrode has at least two different values.

The present invention also discloses a thin film transistor array panel, including an insulating substrate; a plurality of first signal lines formed on the insulating substrate; a plurality of second signal lines crossing the first signal lines and insulated from the first signal lines; a plurality of thin film transistors coupled with the first signal lines and the second signal lines; and a plurality of pixels including a plurality of first sub-pixel electrodes coupled with the thin film transistors, a plurality of coupling electrodes coupled with the thin film transistors, and a plurality of second sub-pixel electrodes overlapping the coupling electrodes, wherein an overlapping area of the coupling electrodes and the second sub-pixel electrodes has at least two different values.

The present invention also discloses a liquid crystal display, including an insulating substrate; a plurality of first signal lines formed on the insulating substrate; a plurality of second signal lines crossing the first signal lines and insulated from the first signal lines; a plurality of thin film transistors coupled with the first signal lines and the second signal lines; and a plurality of pixels including a plurality of first sub-pixel electrodes coupled with the thin film transistors and a plurality of second sub-pixel electrodes capacitively coupled with the first sub-pixel electrodes, wherein the pixels include a red pixel, a green pixel, and a blue pixel and a voltage ratio of the second sub-pixel electrode with respect to the first sub-pixel electrode is different among the red pixel, the green pixel, and the blue pixel so that a brightness ratio of the red component, the green component, and the blue component at a lateral position in a gray level is nearer to a brightness ratio of the red component, the green component, and the blue component at a front position in the gray level as compared with not having different voltage ratios among the red pixel, the green pixel, and the blue pixel.

The present invention also discloses a liquid crystal display, including n insulating substrate; a plurality of first signal lines formed on the insulating substrate; a plurality of second signal lines crossing the first signal lines and insulated from the first signal lines; a plurality of thin film transistors coupled with the first signal lines and the second signal lines; and a plurality of pixels including a plurality of first sub-pixel electrodes coupled with the thin film transistors and a plurality of second sub-pixel electrodes capacitively coupled with the first sub-pixel electrodes, wherein a ratio of an area of the second sub-pixel electrode with respect to an area of the first sub-pixel electrode has at least two different values.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
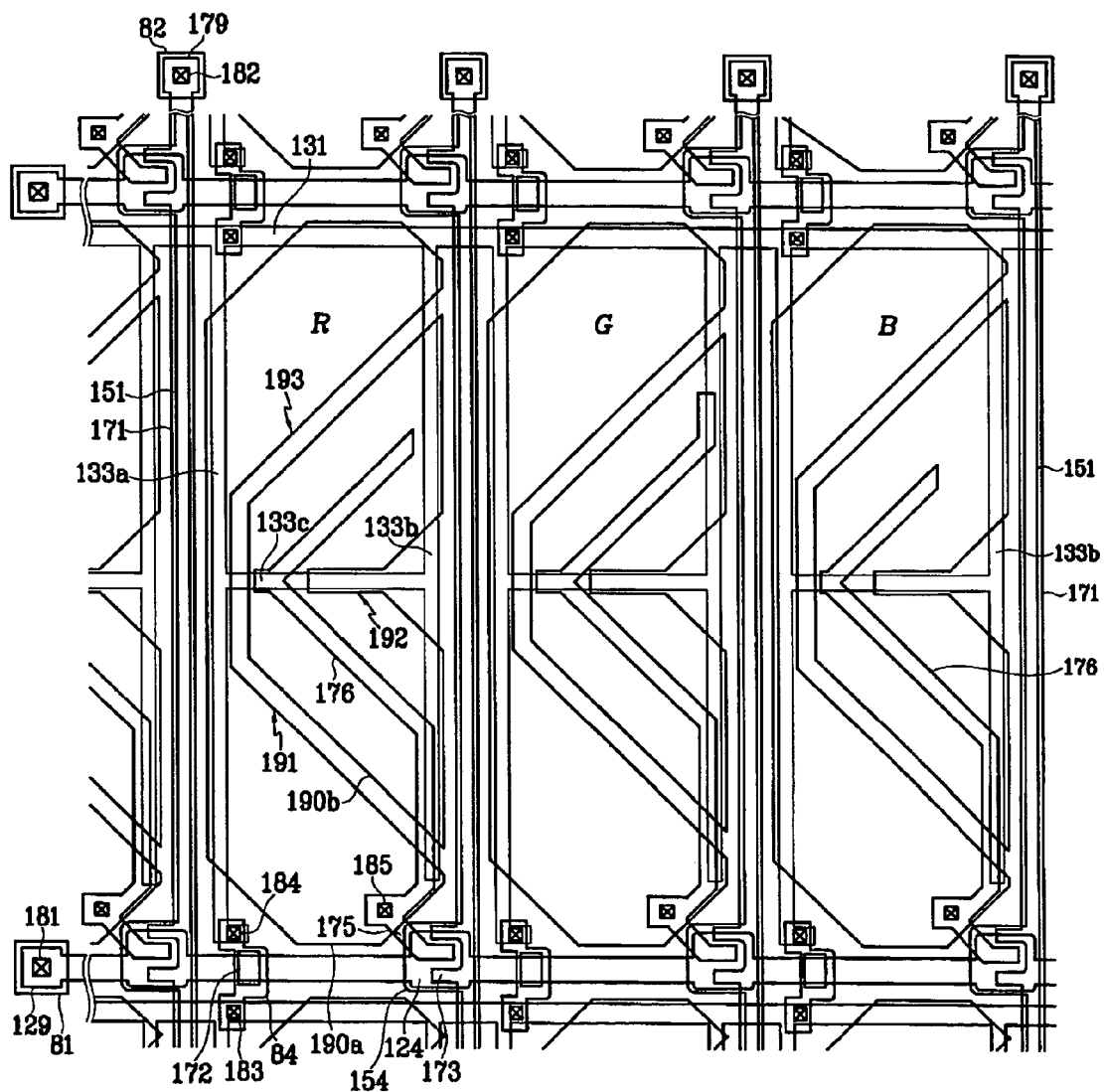
FIG. 1 is a layout view of a thin film transistor (TFT) array panel for an LCD according to an embodiment of the invention.

The present invention is described more fully below with reference to the accompanying drawings, in which preferred embodiments of the invention are shown. The present invention may, however, be embodied in many different forms and should not be construed as being limited to the embodiments set forth herein.

In the drawings, the thickness of layers, films, and regions are exaggerated for clarity. Like numerals refer to like elements throughout. It is understood that when an element such as a layer, film, region, or substrate is referred to as being "on" another element, the element can be directly on the other element or intervening elements may also be present. In contrast, when an element is referred to as being "directly on" another element, there are no intervening elements present.

Liquid crystal displays and thin film transistor (TFT) array panels for LCDs according to embodiments of the invention are described below with reference to the accompanying drawings.

Figure 2:
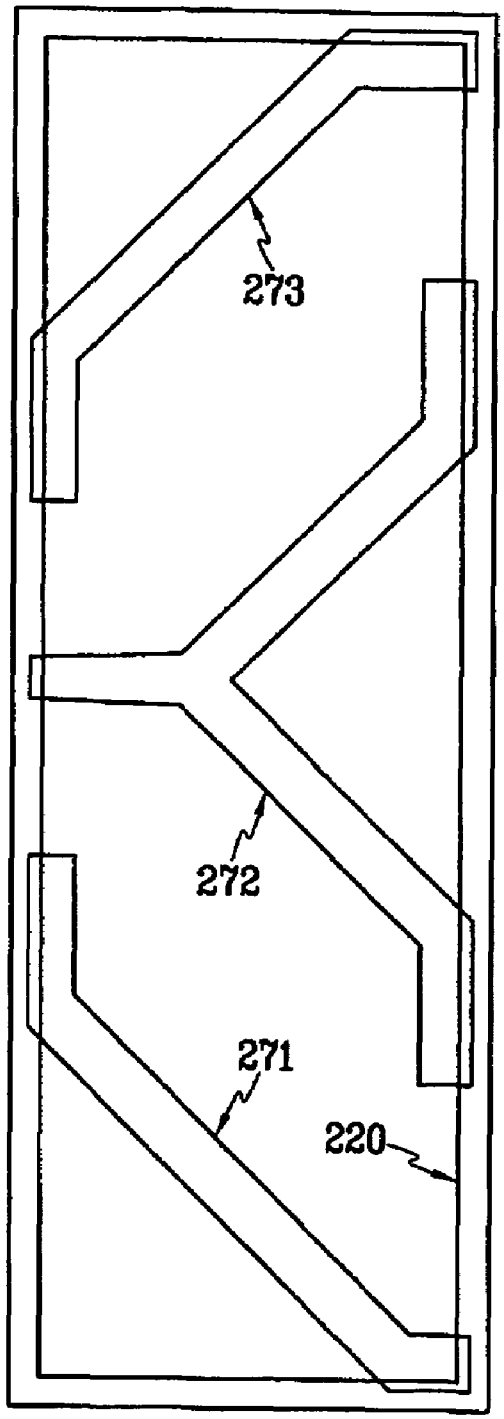
FIG. 2 is a layout view of a color filter panel for an LCD according to an embodiment of the invention.
Figure 3:
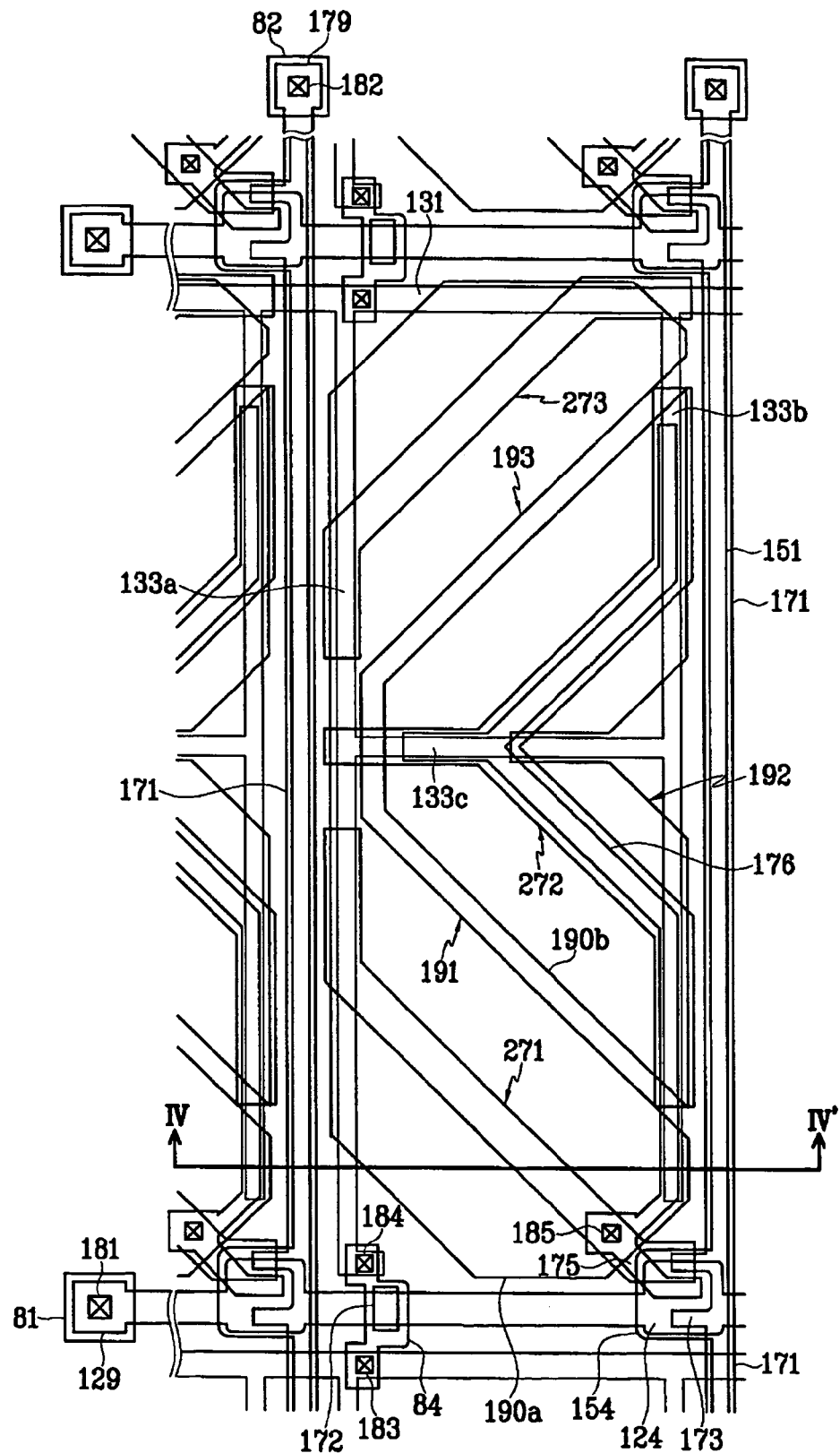
FIG. 3 is a layout view of a red pixel of an LCD according to the embodiment shown in FIG. 1 and FIG. 2.
Figure 4:
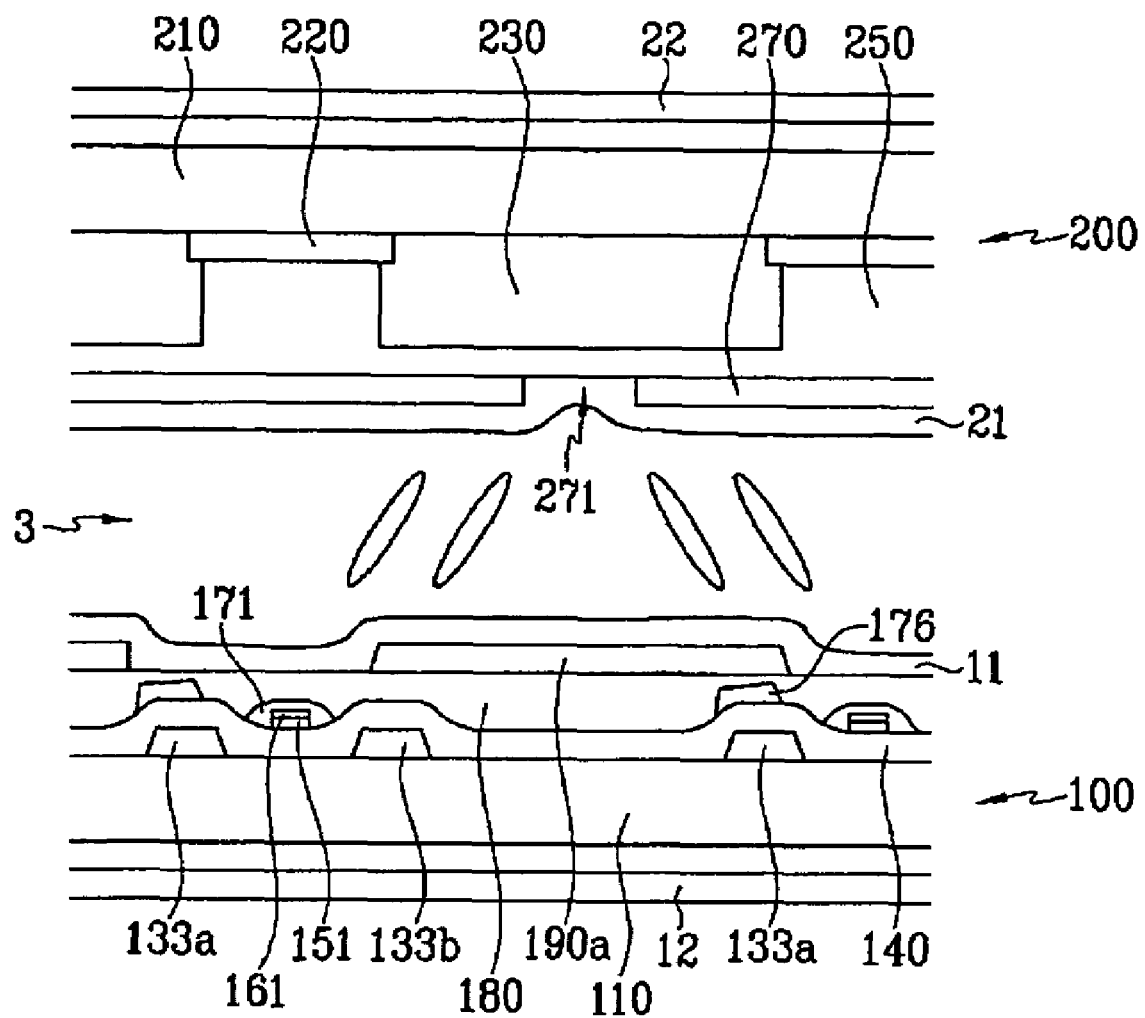
FIG. 4 is a sectional view of the LCD shown in FIG. 3 taken along the line IV-IV'.

FIG. 1 is a layout view of a thin film transistor (TFT) array panel for an LCD according to an embodiment of the invention. FIG. 2 is a layout view of a color filter panel for an LCD according to an embodiment of the invention. FIG. 3 is a layout view of a red pixel of an LCD according to the embodiment shown in FIG. 1 and FIG. 2. FIG. 4 is a sectional view of the LCD shown in FIG. 3 taken along the line IV-IV'.

According to an embodiment of the invention, an LCD includes a TFT array panel 100, a common electrode panel 200, and a LC layer 3 provided between the panels 100 and 200 and including a plurality of LC molecules aligned vertically with respect to surfaces of the panels 100 and 200.

A structure of the TFT array panel 100 is described below.

A plurality of first and second sub-pixel electrodes 190a and 190b made of indium tin oxide (ITO) or indium zinc oxide (IZO) may be formed on an insulating substrate 110 made of a transparent material, such as glass. The first sub-pixel electrode 190a is connected with a thin film transistor and receives image data voltages. The second sub-pixel electrode 190b overlaps with a coupling electrode 176 that is connected with the first sub-pixel electrode 190a. Therefore, the second sub-pixel electrode 190b is electrically coupled with the first sub-pixel electrode 190a.

The overlapping areas between the second sub-pixel electrode 190b and the coupling electrode 176 are different among red, green, and blue pixels.

A polarizer 12 is attached with the lower surface of the insulating substrate 110. When a reflective LCD is considered, the first and second pixel electrodes 190a and 190b may be made of a non-transparent material. It is understood that the polarizer 12 may be omitted when necessary.

A structure of the common electrode panel 200 is described below.

A light blocking layer 220 to prevent light leakage, red, green, and blue color filters 230, and a common electrode 270 made of a transparent conductor, such as ITO or IZO are formed on an insulating substrate 210 made of a transparent material, such as glass.

The common electrode 270 includes cutouts 271, 272, and 273. The light blocking layer 220 may be formed on areas overlapping the cutouts 271, 272, and 273, as well as near pixel areas to prevent light leakage due to the cutouts 271, 272, and 273.

Alignment layers 11 and 21 are respectively formed on inner surfaces of the two panels 100 and 200 to align liquid crystal molecules. The alignment layers 11 and 21 may vertically align the liquid crystal molecules with respect to the surfaces of the substrates 110 and 210; however, this is not necessary.

The TFT array panel 100 is described below with reference to FIGS. 1, 4, and 5.

A plurality of gate lines 121 and a plurality of storage electrode lines 131 are formed on an insulating substrate 110.

The gate lines 121 extend substantially in a transverse direction and each gate line 121 has a plurality of protruding gate electrodes 124, e.g., PROTRUSIONS, protruding along upper and lower side, and an expansion 129 or end portion for connecting to an external circuit. The expansion 129 may be wider than other portions of the gate line 121 except for the gate electrodes 124.

The gate lines 121 transmit gate signals and extend substantially in a transverse direction. The expansion 129 of the gate lines 121 has an area that is sufficiently large for contact with another layer or an external driving circuit. A gate driving circuit (not shown) for generating the gate signals may be mounted or attached on a flexible printed circuit (FPC) film (not shown). The FPC may be attached with the substrate 110, directly mounted on the substrate 110, or integrated onto the substrate 110. The gate lines 121 may extend and connect with a driving circuit that may be integrated on the substrate 110.

Each storage electrode line 131 extends substantially in the transverse direction and includes a plurality of sets of storage electrodes 133a, 133b, and 133c. Two storage electrodes 133a and 133b are extended substantially in a longitudinal direction and are connected with a transverse storage electrode 133c. The storage line 131 may include two or more transverse lines. The storage electrode line 131 may be provided at a substantially center portion of the two adjacent gate lines 121.

The gate lines 121 and the storage electrode lines 131 may be made of an Al containing metal such as Al and Al alloy, an Ag containing metal such as Ag and Ag alloy, a Cu containing metal such as Cu and Cu alloy, a Mo containing metal such as Mo and Mo alloy, Cr, Ta, or Ti. The gate lines 121 may have a multi-layered structure including two conductive films not shown) having different physical characteristics. One of the two films may be made of a low resistivity metal including the Al containing metal, the Ag containing metal, and the Cu containing metal for reducing signal delay or voltage drop. The other film may be made of material such as a Mo containing metal, a Cr containing metal, a Ta containing metal, or a Ti containing metal, which have good physical, chemical, and electrical contact characteristics with other materials such as indium tin oxide (ITO) or indium zinc oxide (IZO). The gate lines 121 and the storage electrode lines 131 may be formed of various metal or conductor other than the above described materials.

The lateral sides of the gate lines 121 and the storage electrode lines 131 are tapered or angled, and the inclination angle of the lateral sides with respect to a surface of the substrate 110 ranges between about 30 to about 80 degrees.

A gate insulating layer 140 may be made of silicon nitride (SiNx) and is formed on the gate lines 121 and the storage electrode lines 131.

A plurality of data lines 171, a plurality of drain electrodes 175, and a plurality of under-bridge metal pieces 172 are formed on the gate insulating layer 140.

Each data line 171 extends substantially in the longitudinal direction and has a plurality of source electrodes 173 extending toward the drain electrodes 175.

Each data line 171 includes an expansion 179 that may be wider than the data line so that the expansion 179 contacts another layer or an external device.

The drain electrode 175 may extend to form a coupling electrode 176. The coupling electrode 176 may be bent to have a substantially "V" shape. The coupling electrodes 176 for the red, green, and blue pixels each have different lengths. The length of the coupling electrode 176 in the red (R) pixel may be the longest, the length of the coupling electrode 176 in the blue (B) pixel may be the second longest, and the length of the coupling electrode 176 in the green (G) pixel may be the shortest.

The under-bridge metal peaces 172 are disposed on the gate line 121 near the gate electrode 124.

The data lines 171, drain electrodes 175, and the under-bridge metal pieces 172 may be made of a refractory metal such as Cr, Mo, Ta, Ti, or alloys thereof. However, they may have a multilayered structure including a refractory metal film (not shown) and a low resistivity film made of a metal such as an Al containing metal, an Ag containing metal, and a Cu containing metal.

A plurality of semiconductor stripes 151 are formed under the data lines 171 and the drain electrodes 175 and the semiconductor stripes 151 and may extend substantially in a longitudinal direction. The semiconductor stripes 151 may be made of hydrogenated amorphous silicon (abbreviated to "a-Si") or polysilicon and have branches that extended toward the gate electrodes 124, the source electrodes 173, and the drain electrodes 175 to form channels 154 of TFTs.

Ohmic contacts 161 and 165 may only be interposed between the underlying semiconductor stripes 151 and the overlying data conductors 171 and 175 thereon in order to reduce the contact resistance therebetween. The ohmic contact stripes and islands 161 and 165 may be made of n+ hydrogenated a-Si heavily doped with an n-type impurity such as phosphorous or they may be made of silicide. Each ohmic contact stripe 161 has a plurality of projections 163. The projections 163 and the ohmic contact islands 165 may be located in pairs on the projections 154 of the semiconductor stripes 151.

A passivation layer 180 made of an organic material having photosensitivity and having a good planarization characteristic, a low dielectric material such as a-Si:C:O, a-Si:O:F which are formed by plasma enhanced chemical vapor deposition (PECVD), or an inorganic material such as silicon nitride may be formed on the data lines 171, the drain electrodes 175, and the under-bridge metal piece 172. The passivation layer 180 may be a single layer formed one of such materials or be multiple layers formed by combining such materials. For example, the passivation layer 180 may includes a bottom layer of SiNx and a top layer of an organic material, or vice-versa.

The passivation layer 180 includes a plurality of contact holes 185 and 182 exposing a portion of the drain electrode 175 and the expansion 179 of the data line 171, respectively. The passivation layer 180 and the gate insulating layer 140 include a plurality of contact holes 181, 184, and 183 exposing the expansion 129 of-the gate line 121 and two portions of the storage electrode line 131, respectively.

A plurality of pixel electrodes 190, a plurality of contact assistants 81 and 82, and storage bridges 84 are formed on the passivation layer 180. They may be made of a transparent conductive material such as ITO or IZO or reflective and conductive material such as Ag, Al, or alloys thereof.

Each pixel electrode 190 includes a first sub-pixel electrode 190a and a second sub-pixel electrode 190b. The first sub-pixel electrode 190a is connected with, e.g., coupled, the drain electrode 175 through the contact hole 185. The second sub-pixel electrode 190b is electrically floated and capacitively coupled with the first sub-pixel electrode 190a. The coupling capacitances formed between the first sub-pixel electrode 190a and the second sub-pixel electrode 190b are different among the green, red, and blue pixels.

The coupling capacitances formed between the first sub-pixel electrode 190a and the second sub-pixel electrode 190b decrease in the following order due to the length shortening of the coupling electrodes 176: red (R), blue (B), and green (G) pixels. The coupling capacitances of the first sub-pixel electrode 190a and the second sub-pixel electrode 190b among green, red, and blue pixel may be made different according to other methods, such as width and positional differentiation of the coupling electrode 176, rather than by length differentiation. In any case, overlapping area between the coupling electrode 176 and the second sub-pixel electrode 190b determines the capacitance of the coupling capacitor and the capacitance increases along with increase of the overlapping area.

Cutouts 191, 193, and 194 dividing the first sub-pixel electrode 190a and the second sub-pixel electrode 190b may be classified into oblique portions 191 and 193 forming an angle of about 45 degrees with the gate line 121, and a longitudinal portion 194 making an angle of about 90 degrees with the gate line 121. The two oblique portions 191 and 193 together form an angle of about 90 degrees.

The second sub-pixel electrode 190b has a cutout 192 which initiates from the right side of the second sub-pixel electrode 190*b* and extends toward the left side. The entrance of the cutout 191 widens due to the corner cut of the second sub-pixel electrode 190*b*.

The first sub-pixel electrode 190*a* and the second sub-pixel electrode 190*b* respectively are substantially symmetrical about a longitudinal center line of a pixel.

The storage bridge 84 crosses over the gate line 121 and connects two storage lines that are disposed on each side of the gate line 121. The storage bridge 84 makes contact with the storage electrode 133*a* and the storage electrode line 131 through the contact holes 183 and 184. The storage bridge 84 overlaps the under-bridge metal piece 172. The storage bridge 84 electrically connects each of the storage electrode lines 131 on the insulating substrate 110.

The storage electrode lines 131 may be used to repair defects of the gate lines 121 and the data lines 171. Such repairs may be performed using a laser. The under-bridge metal piece 172 provides electrical connection of the gate line 121 and the storage bridge 84.

The contact assistants 81 and 82 are respectively connected with the expansion 129 of the gate line 121 and the expansion 179 of the data line 171 through the contact holes 181 and 182.

The description of the common electrode panel 200 is described below with reference to FIGS. 2, 3, and 4.

A light blocking member 220, referred to as a black matrix, for preventing light leakage is formed on an insulating substrate 210. The light blocking member 220 may have a plurality of openings that face the pixel electrodes 190 and it may have substantially the same planar shape as the pixel electrodes 190.

A plurality of color filters 230 are also formed on the substrate 210 and they are disposed substantially in the areas enclosed by the light blocking member 220 and may overlap edge portions of the light blocking member 220. The color filters 230 may extend substantially along the longitudinal direction along the pixel electrodes 190. The color filters 230 may represent one of the primary colors such as red, green, and blue colors.

An overcoat 250 is formed on the color filters 230 and the light blocking member 220. The overcoat 250 is may be made of (organic) insulator and it prevents the color filters 230 from being exposed and provides a substantially flat surface.

A common electrode 270 is formed on the overcoat 250. The common electrode 270 may be made of a transparent conductive material such as ITO and IZO and has a plurality of sets of cutouts 271, 272, and 273.

A set of cutouts 271, 272, and 273 include oblique portions and end portions. The oblique portions of the cutouts 271, 272, and 273 are substantially parallel with the oblique portions 191 and 193 of the cutout between the pixel sub-electrodes 190*a* and 190*b*. The oblique portions 191 and 193 are disposed between the oblique portions of the cutouts 271, 272, and 273. The end portions overlap with the boundary line of the pixel area and include substantially longitudinal end portions and substantially transverse end portions.

The LCD includes a TFT array panel 100, a color filter array panel 200 facing the TFT array panel 100 and separated therefrom by a predetermined space, and a liquid crystal layer 3 filled or provided in the predetermined space.

When the two panels 100 and 200 are assembled, the cutouts 271, 272, and 273 of the common electrode 270 divide the two sub-pixel electrodes 190*a* and 190*b* into a plurality of sub-areas. In the present embodiment, as shown in FIG. 3, the two sub-pixels 190*a* and 190*b* are respectively divided into four sub-areas. As shown in FIG. 3, each sub-area has two parallel long edges and several short edges. Therefore, the sub-areas have length direction and width direction.

Each liquid crystal 3 portion disposed between each of the sub-areas of the pixel electrodes 190 and corresponding sub-areas of the common electrode 270 is referred to as a sub-region. The sub-regions are classified into four species according to the average long axis direction of liquid crystals disposed therein. The sub-regions are referred to as a domain hereinbelow.

The first sub-pixel electrode 190*a* is physically and electrically coupled or connected with the drain electrodes 175 through the contact holes 181. The second sub-pixel electrode 190*b* is physically and electrically floated and overlaps with the coupling electrode 176 to form coupling capacitances with the first sub-pixel electrodes 190*a*. Therefore, the voltage of the second sub-pixel electrode 190*b* depends on the voltage of the first sub-pixel electrode 190*a*. The voltage of the second sub-pixel electrode 190*b* with respect to the common voltage is always smaller than that the voltage of the first sub-pixel electrode 190*a*.

When a pixel area includes two sub-areas with different electric fields, lateral visibility is improved by the mutual compensation in the two sub-areas.

The coupling relationship between the first sub-pixel electrode 190*a* and the second sub-pixel electrode 190*b* is described below with reference to FIG. 5.

Figure 5:
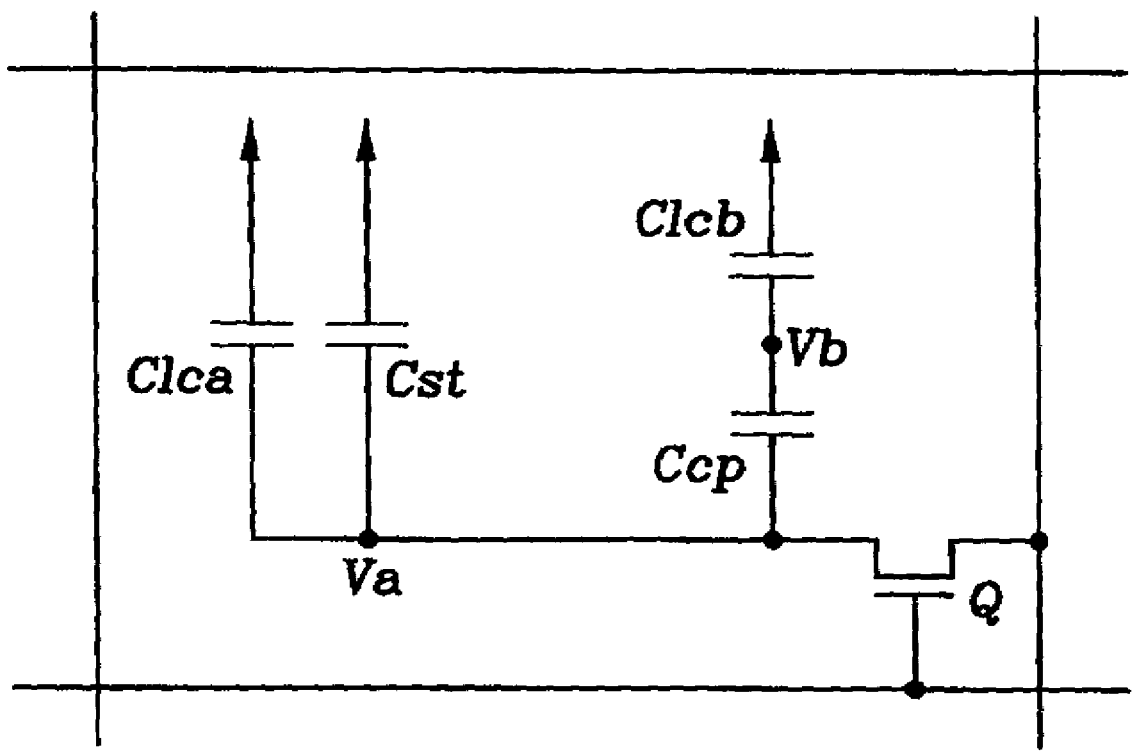
FIG. 5 is a circuit diagram of the LCD shown in FIGS. 1, 2, 3, and 4.

FIG. 5 is a circuit diagram of the LCD shown in FIGS. 1, 2, 3, and 4.

In FIG. 5, Clca refers to a liquid crystal (LC) capacitance formed between the first sub-pixel electrode 190*a* and the common electrode 270. Cst refers to a storage capacitance formed between the first sub-pixel electrode 190*a* and the storage line 131. Clcb refers to a liquid crystal (LC) capacitance formed between the second sub-pixel electrode 190*b* and the common electrode 270. Ccp refers to a coupling capacitance formed between the first sub-pixel electrode 190*a* and the second sub-pixel electrode 190*b*.

The voltage Vb of the second sub-pixel electrode 190*b* with reference to the common voltage and the voltage Va of the first sub-pixel electrode 190*a* with reference to the common voltage are related by the voltage distribution law as follows:

$$Vb = Va \times [Ccp/(Ccp+Clcb)].$$

Since Ccp/(Ccp+Clcb) must be less than 1, Vb is necessarily less than Va.

The capacitance Ccp may be adjusted by overlapping an area or changing a distance between the second sub-pixel electrode 190*b* and the coupling electrode 176. The overlapping area between the second sub-pixel electrode 190*b* and the coupling electrode 176 may be adjusted by changing the width of the coupling electrode 176. The distance between the second sub-pixel electrode 190*b* and the coupling electrode 176 may be adjusted by changing a location of the coupling electrode 176. That is, in the present embodiment, the coupling electrode 176 is formed on the same layer as the data line 171; however, it is understood that various other structures may be applied.

For example, a coupling assistant electrode (not shown) coupled with the second sub-pixel electrode 190*b* may be formed on the same layer as the gate line 121 and the coupling assistant electrode may be capacitively coupled with the coupling electrode 176 to apply voltages to the second sub-pixel electrode 190*b*. In this case, the gate insulating layer 140 interposed between the coupling electrode 176 and the coupling assistant electrode is the main dielectric of coupling capacitor. This structure may be applied when the passivation layer 180 is made of a thick organic material having a low dielectric constant, thereby coupling capacitance formed by the passivation layer 180 is not sufficient. Furthermore, these structures may be combined to use both the gate insulating layer 140 and the passivation layer 180 as dielectric of the coupling capacitor.

According to an embodiment of the present invention, voltage differences or transmittances between the two sub-pixel electrodes 190a and 190b are different among red, green, and blue pixels due to the difference of coupling capacitance and/or due to the different ratio of area for the two sub-pixel electrodes 190a and 190b. Accordingly, a color reproduction property of the LCD with respect to a memory color at any viewing direction is improved and high transmittance of pixels is maintained. Here, the memory color refers to color memorized or recognized by the human brain. When visibility with respect to the memory color is degraded at a lateral view as compared with a front view, display quality deteriorates.

A method for improving lateral visibility with respect to a specific color is described below in detail with reference to a drawing.

Figure 6:
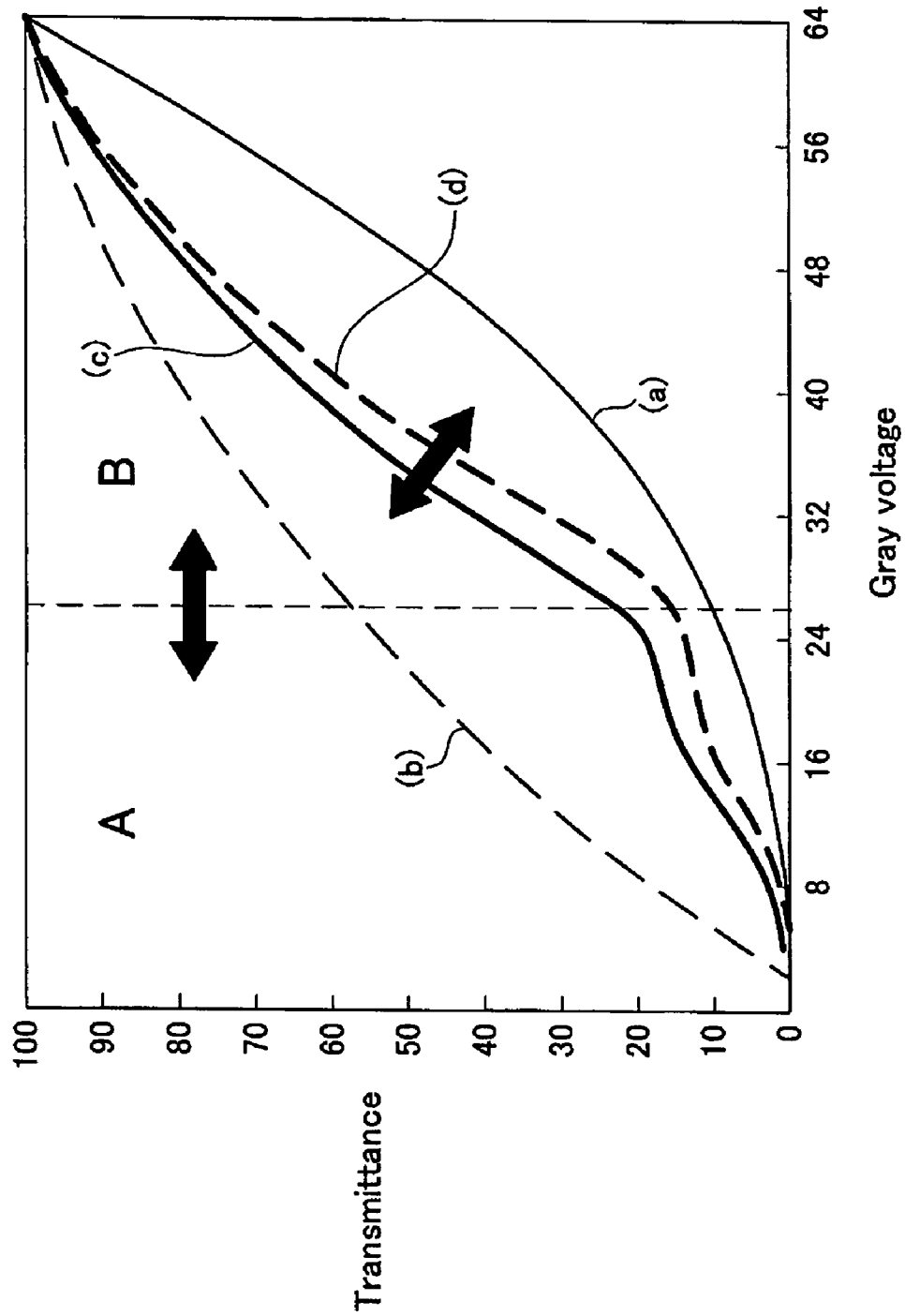
FIG. 6 shows gamma curves relating to an LCD according to an embodiment of the invention.

FIG. 6 shows gamma curves relating to an LCD of the present invention. The solid line (a) is a gamma curve measured at the front where the viewing angle is 0 and the dashed line (b) is a gamma curve measured at a lateral angle of an LCD having pixels which are not split. The bold solid line (c) and bold dashed line (d) are gamma curves measured at a lateral angle of an LCD having pixels that are split, e.g., each pixel having two sub-pixel electrodes having different voltages. Voltage ratios of the two sub-pixel electrodes are different between the bold solid line (c) and the bold dashed line (d).

Referring to FIG. 6, when the lateral gamma curve (b) measured at a viewing angle (for example 60 degrees) is compared with the front gamma curve (a), the lateral angle gamma curve (b) significantly distorts. To solve this problem, when a pixel electrode is split into two sub-pixel electrodes and the two sub-pixel electrodes receive different voltage, the lateral angle gamma curves (c, d) are improved to more closely resemble the front gamma curve (a). Accordingly, the viewing angle increases, thereby improving lateral visibility.

Region A is a low gray voltage region (dark region). Lateral angle gamma curve of region A is substantially determined by a sub-pixel electrode capacitively that is coupled with a sub-pixel electrode connected with a TFT.

Region B is a high gray voltage region (bright region). Lateral angle gamma curve of region B is substantially determined by the sub-pixel electrode connected with the TFT. Here, the gradient of the gamma curve (arrow mark of diagonal direction) is determined by a ratio of the voltage that is applied to the two sub-pixel electrodes. The position (arrow mark of horizontal direction) of boundary of regions A and B may be determined by a ratio of area the two sub-pixel electrodes.

Accordingly, when area ratio or voltage ratio between the two sub-pixel electrodes is differentiated among the red, green and blue pixels, the most appropriate lateral gamma curve in respective view of pixels and grays may be derived. Thereby, lateral visibility may be ultimately improved by considering transmittance. As a result, there is a more stable color reproduction property.

Lateral visibility is improved with respect to the memory colors when an area ratio or a voltage ratio between the two sub-pixel electrodes is large. According to an embodiment of the invention, area ratio or voltage ratio between the two sub-pixel electrodes 190a and 190b was adjusted to make a color tone according to the lateral view nearly to coincide with a color tone of the front view with respect to skin color which is one of the memory colors. The adjustment took into consideration that a voltage ratio of the second sub-pixel electrode 190b with respect to the first sub-pixel electrode 190a in a green pixel and a blue pixel is preferably smaller than a voltage ratio of the second sub-pixel electrode 190b with respect to the first sub-pixel electrode 190a in a red pixel. Additionally, it is even more preferable that the voltage ratio of the second sub-pixel electrode 190b with respect to the first sub-pixel electrode 190a decreases in an order of red, blue and green pixels.

A method for improving lateral angle visibility with respect to a skin color series is described below.

The skin color series generally consists of red, green and blue colors in an amount such that the proportion of red light is greater than green light and the proportion of green light is greater than blue light (>green>blue). When skin color series are viewed in a lateral direction, the color tone is distorted and the proportions of the green light and the blue light are increased with respect to the red light. For example, the skin color series includes 50% of red light, 20-30% of green light, and 10-20% of blue light. As the gray level is lowered, a ratio of a lateral transmittance with respect to a front transmittance (lateral transmittance/front transmittance) increases. For example, when the proportion of red, green, and blue in the front view is 50:20:10, the proportion of red, green, and blue in a lateral view is change to be 60:40:30. This change degrades the color tone in a lateral view. Accordingly, adjustment of gamma curve with respect to red, green, and blue pixel is necessary.

According to an embodiment of the invention, when the area ratio of the first sub-pixel electrode versus the second sub-pixel electrode is 1:1.5 and gray voltage ratio of the R, G, and B is 196:124:96, the voltage ratios of respective pixels are shown below in Table 1.

TABLE 1

| | | | | | | | | | |
|---|---|---|---|---|---|---|---|---|---|
| | Voltage Ratio | 0.800 | 0.775 | 0.750 | 0.725 | 0.700 | 0.675 | 0.650 | 0.625 | 0.600 |
| RED Area Ratio: 1:1.5 Vw: 14 | Transmittance (front, viewing angle: 0 degree) | 56.00 | 55.94 | 55.41 | 55.55 | 56.19 | 55.83 | 56.05 | 55.41 | 55.93 |
| | Transmittance (lateral, viewing angle: 60 degrees) | 64.83 | 65.76 | 66.12 | 66.51 | 67.68 | 67.73 | 68.22 | 68.21 | 69.13 |
| | Lateral/front | 1.16 | 1.18 | 1.19 | 1.20 | 1.20 | 1.21 | 1.22 | 1.23 | 1.24 |

TABLE 2

| Voltage Ratio | 0.800-0.775 | 0.775-0.750 | 0.750-0.725 | 0.725-0.700 | 0.700-0.675 | 0.675-0.650 | 0.650-0.625 | 0.625-0.600 |
|---|---|---|---|---|---|---|---|---|
| Difference of transmittance ratio between Lateral and front | −0.020 | −0.010 | −0.010 | 0.000 | −0.010 | −0.010 | −0.010 | −0.010 |

Table 1 and Table 2 show experimental data for calculating the most appropriate voltage ratio in red pixels.

Table 1 includes data for lateral transmittance values and front transmittance values measured while the voltage ratio is varied from 0.800 to 0.600 and gray level is 196. Table 2 shows a difference of the transmittance ratio between the lateral and the front transmittance values calculated from Table 1.

As described above, regarding the skin color series, since the proportion of red component decreases relative to the other colors at a lateral viewing angle, it is preferable for lateral visibility that the transmittance ratio of lateral/front transmittance is enlarged in red pixels. Referring to Table 1 and Table 2, the transmittance ratio between the lateral transmittance and the front transmittance is substantially uniform in red pixels. Meanwhile, as the voltage ratio decreases, the front transmittance may also decrease. Accordingly, when the lateral angle visibility and the front transmittance are both considered, it is preferable that the voltage ratio is determined in a range between about 0.675 and about 0.800, which is a relatively high voltage range. In the present embodiment, 0.700 is determined to be the most appropriate voltage ratio for red pixels.

Table 3 and Table 4 show experimental data for calculating the most appropriate voltage ratio in green pixels.

Table 3 includes lateral transmittance values and front transmittance values measured while the voltage ratio is varied from 0.800 to 0.600 and a gray level is 124. Table 4 shows a difference of a transmittance ratio between the lateral and the front transmittance values calculated from Table 3.

As described above, regarding the skin color series, since proportion of green component increases relative to the red component at a lateral viewing angle, it is preferable for lateral visibility that the transmittance ratio of lateral/front transmittance is reduced in green pixels. Referring to Table 3, the lateral viewing angle improves when the voltage ratio of the green pixels decreases. However, if the voltage ratio decreases too much, the transmittance at the front may also decrease.

The variation of transmittance ratio between the lateral and front transmittance, which is induced by varying the voltage ratio, is large in green pixels. The variation of transmittance ratio is saturated at voltage ratio of about 0.600-0.650, which differs from the red pixels. In the present embodiment, when considering both the lateral visibility and the front transmittance, 0.625 is determined to be the most appropriate voltage ratio for green pixels.

TABLE 3

| | Voltage Ratio | 0.800 | 0.775 | 0.750 | 0.725 | 0.700 | 0.675 | 0.650 | 0.625 | 0.600 |
|---|---|---|---|---|---|---|---|---|---|---|
| GREEN Area Ratio: 1:1.5 Vw: 14 | Transmittance (front, viewing angle: 0 degree) | 19.72 | 19.58 | 19.46 | 19.53 | 19.49 | 19.53 | 19.69 | 19.63 | 19.65 |
| | Transmittance (lateral, viewing angle: 60 degrees) | 38.86 | 38.09 | 37.04 | 36.11 | 34.27 | 32.25 | 30.43 | 28.12 | 27.20 |
| | Lateral/front | 1.97 | 1.95 | 1.90 | 1.85 | 1.76 | 1.65 | 1.55 | 1.43 | 1.38 |

TABLE 4

| Voltage Ratio | 0.800-0.775 | 0.775-0.750 | 0.750-0.725 | 0.725-0.700 | 0.700-0.675 | 0.675-0.650 | 0.650-0.625 | 0.625-0.600 |
|---|---|---|---|---|---|---|---|---|
| Difference of transmittance ratio between Lateral and front | 0.020 | 0.050 | 0.050 | 0.090 | 0.110 | 0.100 | 0.120 | 0.050 |

TABLE 5

| | Voltage Ratio | 0.800 | 0.775 | 0.750 | 0.725 | 0.700 | 0.675 | 0.650 | 0.625 | 0.600 |
|---|---|---|---|---|---|---|---|---|---|---|
| BLUE Area Ratio: 1:1.5 Vw: 14 | Transmittance (front, viewing angle: 0 degree) | 10.76 | 10.71 | 10.74 | 10.89 | 10.83 | 10.73 | 10.91 | 10.74 | 10.72 |
| | Transmittance (lateral, viewing angle: 60 degrees) | 31.52 | 29.52 | 26.91 | 25.26 | 23.61 | 22.55 | 22.41 | 22.24 | 22.23 |
| | Lateral/front | 2.93 | 2.76 | 2.50 | 2.32 | 2.18 | 2.10 | 2.05 | 2.07 | 2.07 |

TABLE 6

| Voltage Ratio | 0.800-0.775 | 0.775-0.750 | 0.750-0.725 | 0.725-0.700 | 0.700-0.675 | 0.675-0.650 | 0.650-0.625 | 0.625-0.600 |
|---|---|---|---|---|---|---|---|---|
| Difference of transmittance ratio between Lateral and front | 0.170 | 0.260 | 0.180 | 0.140 | 0.080 | 0.050 | −0.020 | 0.000 |

Table 5 and Table 6 show data of experiment to calculate the most appropriate voltage ratio in blue pixels.

Table 5 includes lateral transmittance values and front transmittance values measured while the voltage ratio is varied from 0.800 to 0.600 and a gray level is 96. Table 6 shows a difference of a transmittance ratio between the lateral and the front transmittance values calculated from Table 5.

As described above, regarding the skin color series, since a proportion of blue component increases relative to the red component at a lateral viewing angle, it is preferable for lateral visibility that the transmittance ratio of the lateral/front transmittance is reduced in blue pixels. Referring to Table 5, lateral visibility increases as the voltage ratio of blue pixels decreases. However, if the voltage ratio decreases too much, the transmittance at the front may also decrease.

The variation of a transmittance ratio between the lateral and front transmittance, which is induced by varying voltage ratio, is large in blue pixels. The variation of transmittance ratio is saturated at voltage ratio of about 0.650 to 0.700, which is different from red pixels. In the present embodiment, when considering both the lateral angle visibility and the front transmittance, 0.675 is determined to be the most appropriate voltage ratio for blue pixels.

Below Table 7 shows improvement of lateral visibility achieved by applying the most appropriate voltage ratios to the respective red, green, and blue pixels.

In every skin color, such as Skin 2 (Light skin; R, G, B: 207, 140, 100), Skin 3 (Pale orange; R, G, B: 192, 128, 64), Skin 4 (Dark skin), and Skin 1 (SONY Skin) (which was concerned in the described embodiment), when the voltage ratios are arranged according to various grades of color from, e.g., gradated, among the pixels, lateral visibility improves relative to when the voltage ratios are equivalent among the pixels. For example, R, G, B gradated 1 shows high improvement of lateral visibility in both of left and right.

Δu'v' of Table 7 represents difference of two colors in the color coordinate of International Commission on Illumination (CIE). When the Δu'v' approaches zero (0), a human perceives the two color as the same color.

In the described embodiment, the area ratio of the second sub-pixel electrode 190b versus the first sub-pixel electrode 190a is 1:1.5. However, the present invention may be applied to other area ratios.

Below Table 8 contains front transmittance and lateral transmittance according to variation of the voltage ratio when the area ratio of the two sub-pixels is 1:1. Below Table 9 contains front transmittance and lateral transmittance according to variation of the voltage ratio when the area ratio of the two sub-pixels is 1:2.

TABLE 7

| | Vw | 14.0 V | 14.5 V | 14.5 V | 14.5 V |
|---|---|---|---|---|---|
| | Device | 40.0"W2 | 17.0"E6 | 17.0"E6 | 17.0"E6 |
| | Area Ratio | 1:1 | 1.45:1 | 1.45:1 | 1.45:1 |
| | Voltage Ratio (R:G:B) | 0.75:0.75:0.75 | 0.7:0.7:0.7 | 0.7:0.625:0675 | 0.7:0.7:0.6 |
| Δu'v' At lateral 60 degrees | SONY Skin | Left: 0.02 Right: 0.021 | Left: 0.0107 Right: 0.0174 | Left: 0.0055 Right: 0.0106 | Left: 0.0161 Right: 0.0216 |
| | Light Skin | Left: 0.0130 Right: 0.0154 | Left: 0.0067 Right: 0.0116 | Left: 0.0071 Right: 0.0125 | Left: 0.0128 Right: 0.0141 |
| | Pale Orange | Left: 0.0173 Right: 0.0177 | Left: 0.0101 Right: 0.0159 | Left: 0.0050 Right: 0.0120 | Left: 0.0142 Right: 0.0210 |
| | Dark Skin | Left: 0.0245 Right: 0.0260 | Left: 0.0127 Right: 0.0171 | Left: 0.0084 Right: 0.0133 | Left: 0.0185 Right: 0.0244 |
| | Note | S-PVA | R, G, B equivalent | R, G, B gradated 1 | R, G, B gradated 2 |

TABLE 8

| | Voltage ratio | 0.8 | 0.775 | 0.75 | 725 | 0.7 | 0.675 | 0.65 | 0.625 | 0.6 |
|---|---|---|---|---|---|---|---|---|---|---|
| RED | Front transmittance | 56.27 | 56.33 | 55.96 | 55.57 | 56.11 | 55.78 | 55.89 | 55.90 | 56.09 |
| | Lateral transmittance | 65.12 | 66.00 | 66.08 | 66.05 | 66.78 | 67.07 | 67.45 | 67.52 | 67.74 |
| | lateral/front | 1.16 | 1.17 | 1.18 | 1.19 | 1.19 | 1.20 | 1.21 | 1.21 | 1.21 |
| GREEN | Front transmittance | 19.68 | 19.40 | 19.34 | 19.40 | 19.43 | 19.69 | 19.58 | 19.63 | 19.50 |
| | Lateral transmittance | 38.31 | 37.12 | 35.87 | 34.34 | 32.81 | 31.32 | 30.05 | 29.65 | 29.42 |
| | lateral/front | 1.95 | 1.91 | 1.85 | 1.77 | 1.69 | 1.59 | 1.53 | 1.51 | 1.51 |
| BLUE | Front transmittance | 10.88 | 10.63 | 10.67 | 10.82 | 10.87 | 10.74 | 10.88 | 10.84 | 10.91 |
| | Lateral transmittance | 31.11 | 29.22 | 27.49 | 26.69 | 25.79 | 25.32 | 25.34 | 25.41 | 25.01 |
| | lateral/front | 2.86 | 2.75 | 2.58 | 2.47 | 2.37 | 2.36 | 2.33 | 2.34 | 2.29 |

TABLE 9

| | Voltage ratio | 0.8 | 0.775 | 0.75 | 725 | 0.7 | 0.675 | 0.65 | 0.625 | 0.6 |
|---|---|---|---|---|---|---|---|---|---|---|
| RED | Front transmittance | 56.17 | 55.90 | 55.49 | 55.57 | 55.81 | 55.61 | 55.48 | 56.28 | 55.20 |
| | Lateral transmittance | 64.94 | 65.49 | 66.24 | 66.83 | 67.66 | 68.05 | 68.33 | 69.56 | 69.33 |
| | lateral/front | 1.16 | 1.17 | 1.19 | 1.20 | 1.21 | 1.22 | 1.23 | 1.24 | 1.26 |
| GREEN | Front transmittance | 19.29 | 19.33 | 19.45 | 19.26 | 19.71 | 19.57 | 19.47 | 19.57 | 19.68 |
| | Lateral transmittance | 38.90 | 38.44 | 38.01 | 36.78 | 36.07 | 34.15 | 31.86 | 29.33 | 26.75 |
| | lateral/front | 2.02 | 1.99 | 1.95 | 1.91 | 1.83 | 1.74 | 1.64 | 1.50 | 1.36 |
| BLUE | Front transmittance | 10.74 | 10.69 | 10.84 | 10.76 | 10.75 | 10.78 | 10.76 | 10.85 | 10.89 |
| | Lateral transmittance | 31.47 | 29.79 | 28.07 | 25.19 | 23.44 | 21.57 | 20.76 | 20.52 | 20.43 |
| | lateral/front | 2.93 | 2.79 | 2.59 | 2.34 | 2.18 | 2.00 | 1.93 | 1.89 | 1.88 |

Similar to when the area ratio is 1:1.5, when both the lateral visibility and the front transmittance are considered, the most appropriate voltage ratio, when the area ration is 1:1, is R:G:B=0.725:0.65:0.7, the most appropriate voltage ratio, when the area ration is 1:2, is R: G:B=0.675:0.60:0.65.

Table 10 summarizes the above descriptions.

TABLE 10

| | Area Ratio (MAIN:SUB) | | | Note |
|---|---|---|---|---|
| | 1:1 | 1:1.5 | 1:2 | |
| RED | 0.725 | 0.70 | 0.675 | As area ratio of sub-pixel electrodes increases, voltage ratio is required to be reduced for enhancing visibility of skin colors. |
| GREEN | 0.650 | 0.625 | 0.60 | |
| BLUE | 0.70 | 0.675 | 0.650 | |

In Table 10, MAIN represents the first sub-pixel electrode 190a and SUB represents the second sub-pixel electrode 190b.

According to Table 10, the voltage ratios of green pixels are about 0.075 less than that the voltage ratios of red pixels and the voltage ratio of blue pixels are about 0.025 less than that the voltage ratios of blue pixels.

Brightness may be enhanced by increasing an area of the first sub-pixel which is directly connected with the TFT and has a relatively high brightness and reducing an area of the second sub-pixel which is capacitively coupled with the first sub-pixel and has a relatively low brightness. The first sub-pixel and second sub-pixel are disposed in a pixel representing a color highly contributing to the brightness.

The present invention may be applied to a TN(twisted nematic) LCD. Another embodiment having this feature is described below with reference to the drawings.

Figure 7:
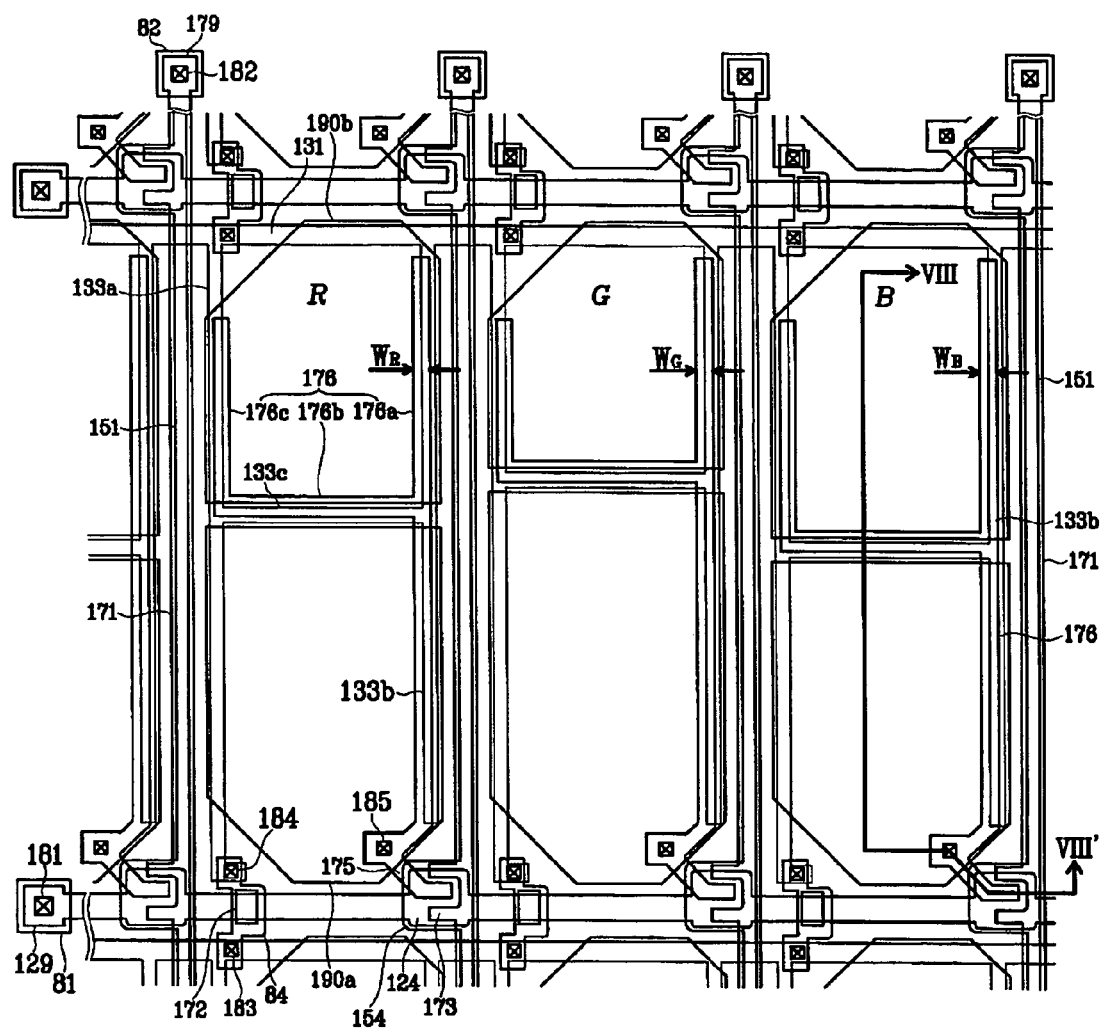
FIG. 7 is a layout view of a TFT array panel for an LCD according to another embodiment of the invention.
Figure 8:
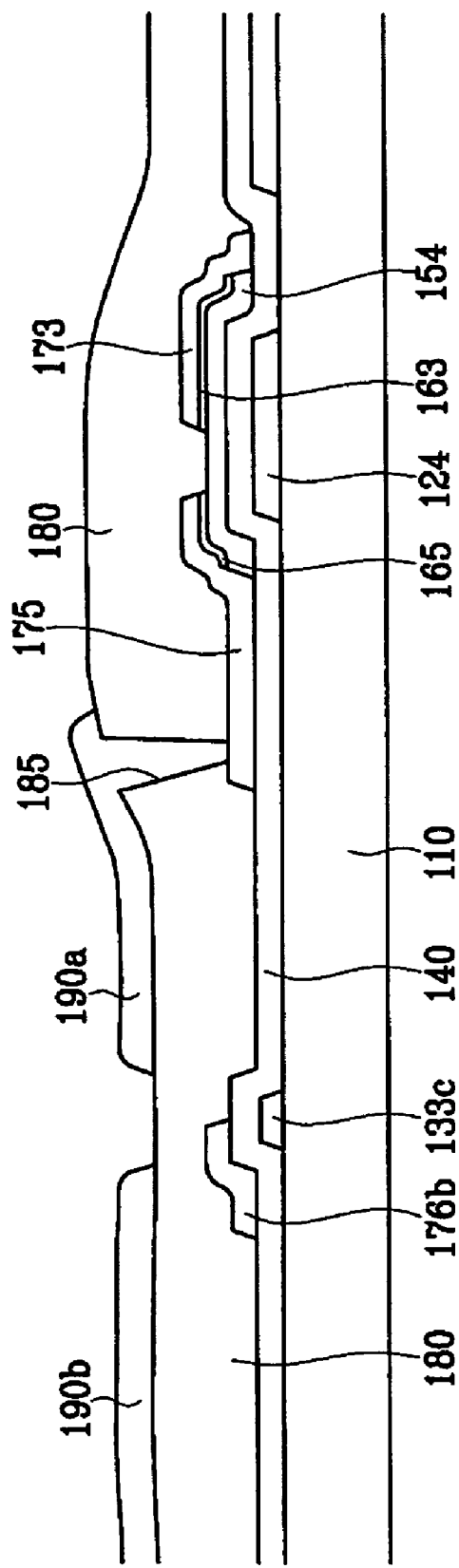
FIG. 8 is a sectional view of the TFT array panel shown in FIG. 7 taken along the line VIII-VIII'.

FIG. 7 is a layout view of a TFT array panel for an LCD according to another embodiment of the invention. FIG. 8 is a sectional view of the TFT array panel shown in FIG. 7 taken along the line VIII-VIII'.

Layered structures of the TFT panel 100 according to this embodiment are substantially the same as those shown in FIGS. 1, 3 and 4.

A plurality of gate lines 121 including gate electrodes 124 and end portions 129, a plurality of storage electrode lines 131 including storage electrodes 133a, 133b, and 133c may be formed on a substrate 110. A gate insulating layer 140, a plurality of semiconductor stripes 151 having projections 154, and a plurality of ohmic contacts 161 and 165 may be sequentially formed on the gate lines 121 and the storage electrodes lines 131. A plurality of data lines 171 including source electrodes 173 and end portions 179, a plurality of drain electrodes 175 including coupling electrodes 176, and a plurality of metal pieces 172 may be formed on the ohmic contacts 161 and 165. A passivation layer 180 may be formed on the data lines 171, the drain electrodes 175, and exposed portions of the semiconductor stripes 151. A plurality of contact holes 181-185 may be provided at the passivation layer 180 and the gate insulating layer 140. A plurality of pixel electrodes 190 including sub-pixel electrodes 190a and 190b, a plurality of storage bridges 84, and a plurality of contact assistants 81 and 82 may be formed on the passivation layer 180.

Different from the TFT array panel shown in FIG. 1, position of the transverse storage electrodes 133c is different according to red (R), green (G) and blue (B) pixels. Specifically, the transverse storage electrode 133c of green pixel is disposed at the most upper portion of the pixel area, the transverse storage electrode 133c of red pixel is disposed at the second most upper portion of the pixel area, and the transverse storage electrode 133c of blue pixel is disposed at the third most upper portion of the pixel area.

The first sub-pixel electrode 190a and the second sub-pixel electrode 190b are divided into upper and lower on the transverse storage electrode 133c, respectively. The coupling electrode 176 extends along the storage electrodes 133a, 133b, and 133c and overlaps the storage electrodes 133a, 133b, and 133c. The coupling electrode 176 includes substantially longitudinal portions 176a and 176c respectively overlapping the storage electrodes 133a and 133b and a substantially transverse portion 133c overlapping the storage electrode 133c. Widths ($W_R$, $W_G$, $W_B$) of the coupling electrodes 176 are different according to the red (R), the green (G), and the blue (B) pixels. Accordingly, overlapping areas between the coupling electrodes 176 and the second sub-pixel electrodes 190b are different according to the red (R), the green (G), and the blue (B) pixels.

Therefore, coupling capacitances between the first sub-pixel electrodes 190a and the second sub-pixel electrodes 190b are different according to the red (R), the green (G), and the blue (B) pixels. Specifically, voltage ratios of the second sub-pixel electrode 190b with respect to the first sub-pixel electrode 190a are different according to the red (R), the green (G), and the blue (B) pixels. Area ratios of the first sub-pixel electrodes 190a versus the second sub-pixel electrodes 190b are also different according to the red (R), the green (G), and the blue (B) pixels. These voltage ratio and area ratio may be adjusted to improve visibility and transmittance.

As described above, when a pixel area includes two sub-areas having different electric fields, lateral visibility is improved by the mutual compensation in the two sub-areas.

In the meantime, voltage differences between the two sub-pixel electrodes 190a and 190b are different among the red, the green, and the blue pixels due to the different coupling capacitance and area ratios. Accordingly, color reproductivity is highly improved to enhance visibility and transmittance of pixel is ultimately enlarged.

Another embodiment of the invention is described below with reference to FIG. 9 and FIG. 10.

Figure 9:
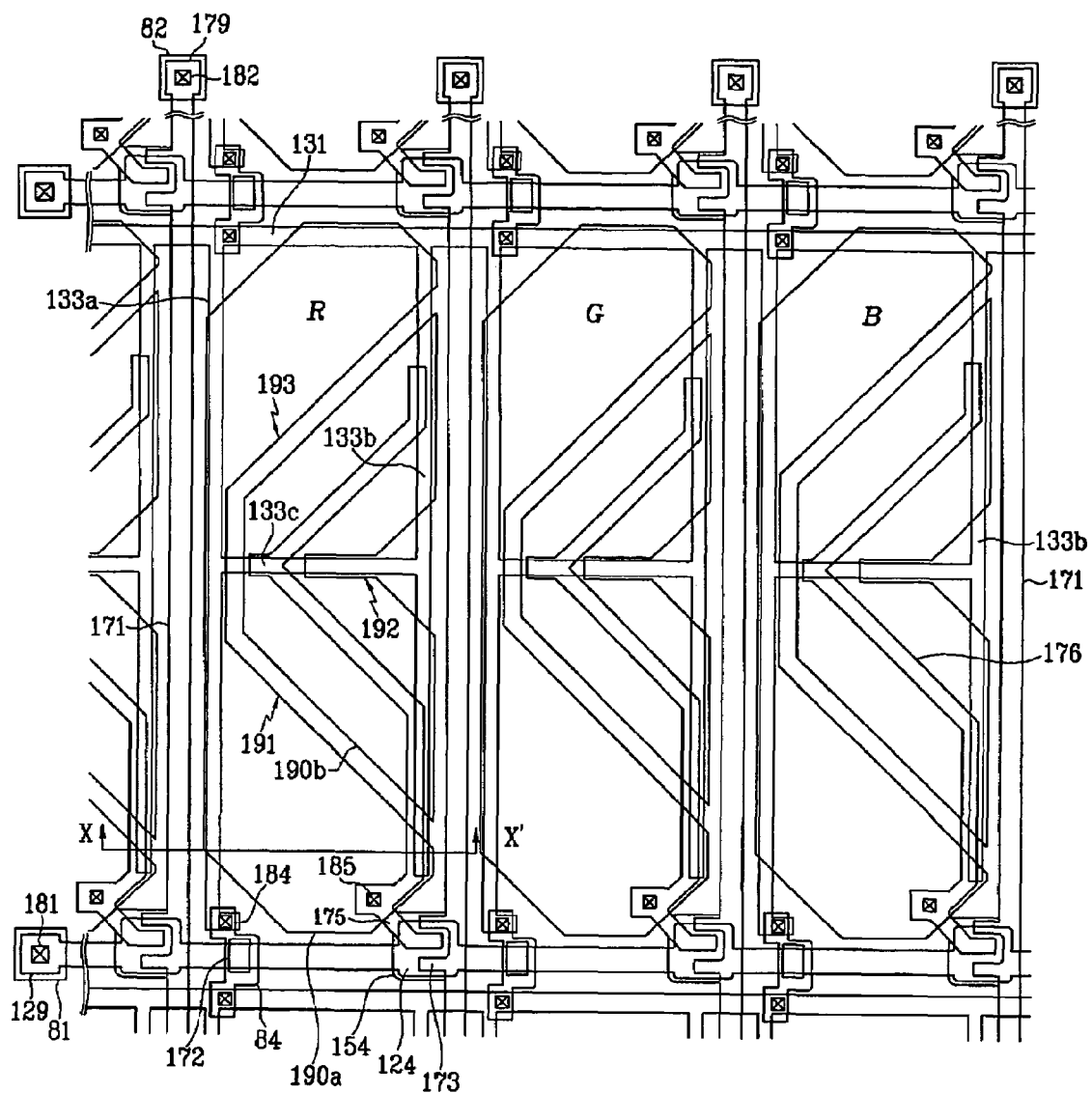
FIG. 9 is a layout view of a TFT array panel for an LCD according to another embodiment of the invention.

FIG. 9 is a layout view of a TFT array panel for an LCD according to another embodiment of the invention. FIG. 10 is a sectional view of an LCD including the TFT array panel shown in FIG. 9 taken along the line X-X'.

Figure 10:
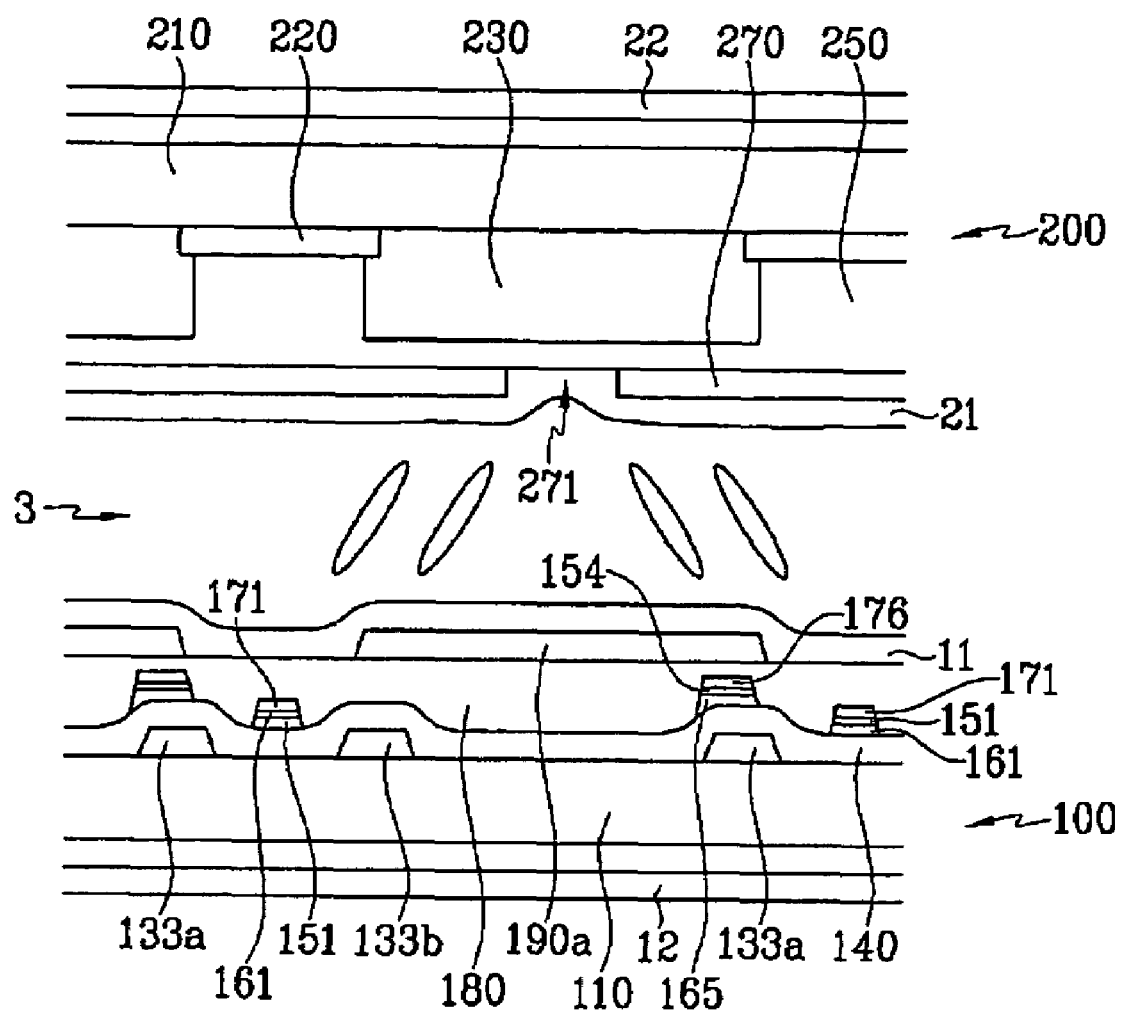
FIG. 10 is a sectional view of an LCD including the TFT array panel shown in FIG. 9 taken along the line X-X'.

Referring to FIG. 9 and FIG. 10, layered structures of the TFT panel 100 are substantially the same as those shown in FIGS. 1, 3 and 4 except for some features described below.

A plurality of gate lines 121 including gate electrodes 124 and end portions 129, a plurality of storage electrode lines 131 including storage electrodes 133a, 133b, and 133c may be formed on a substrate 110. A gate insulating layer 140, a plurality of semiconductor stripes 151 having projections 154, and a plurality of ohmic contacts 161 and 165 may be sequentially formed on the gate lines 121 and the storage electrodes lines 131. A plurality of data lines 171 including source electrodes 173 and end portions 179, a plurality of drain electrodes 175 including coupling electrodes 176, and a plurality of metal pieces 172 may be formed on the ohmic contacts 161 and 165. A passivation layer 180 may be formed on the data lines 171, the drain electrodes 175, and exposed portions of the semiconductor stripes 151. A plurality of contact holes 181-185 may be provided at the passivation layer 180 and the gate insulating layer 140. A plurality of pixel electrodes 190 including sub-pixel electrodes 190a and 190b, a plurality of storage bridges 84 and a plurality of contact assistants 81 and 82 may be formed on the passivation layer 180.

Different from the TFT array panel shown in FIGS. 1, 3 and 4, the semiconductor stripes 151 have substantially the same planar shapes as the data lines 171, the drain electrodes 175, and the underlying ohmic contacts 161 and 165. However, the semiconductor stripes 151 include some exposed portions, which are not covered with the data lines 171 and the drain electrodes 175, such as portions located between the source electrodes 173 and the drain electrodes 175.

Furthermore, area ratios of the first sub-pixel electrodes 190a versus the second sub-pixel electrodes 190b are different according to the red (R), the green (G), and the blue (B) pixels. Area ratio of the second sub-pixel electrode 190b with respect to the first sub-pixel electrode 190a is preferably larger in red pixel than in green pixels or blue pixels. It is preferable that a ratio of an area of the second sub-pixel electrode 190b with respect to an area of the first sub-pixel electrode 190a decreases in an order of red, blue and green pixels.

The TFT array panel for an LCD according the present embodiment of the present invention has coupling electrodes 176, amorphous silicon layers 154, and ohmic contact layers 165 that are formed under the coupling electrodes 176 with substantially the same shape.

To manufacture the above described TFT array panel, a photoresist layer having different thicknesses according to positions is used.

Another embodiment of the invention is described below with reference to FIG. 11 and FIG. 12.

Figure 11:
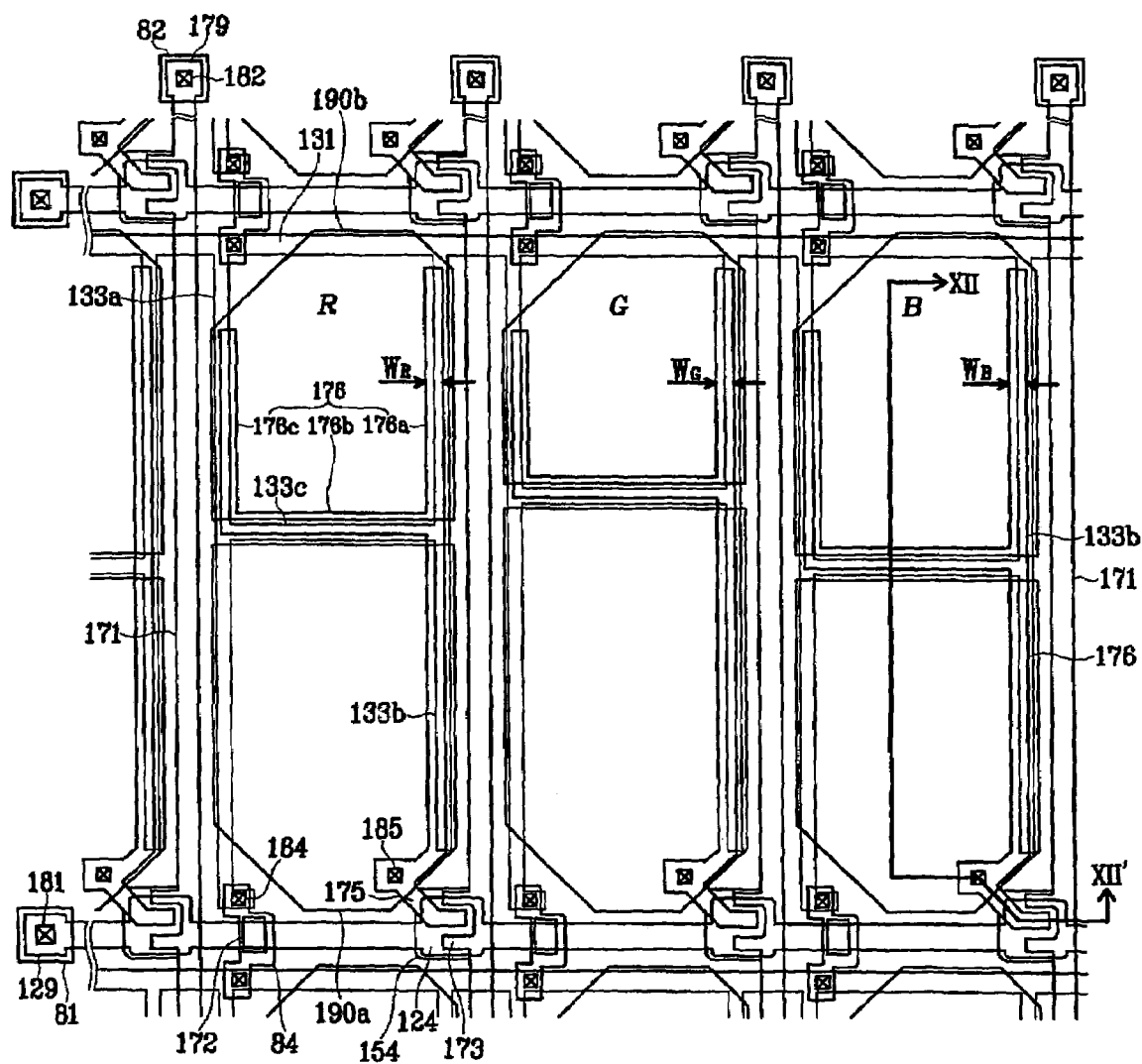
FIG. 11 is a layout view of a TFT array panel for an LCD according to another embodiment of the invention.

FIG. 11 is a layout view of a TFT array panel for an LCD according to another embodiment of the invention. FIG. 12 is a sectional view of an LCD including the TFT array panel shown in FIG. 11 taken along the line XII-XII'.

Figure 12:
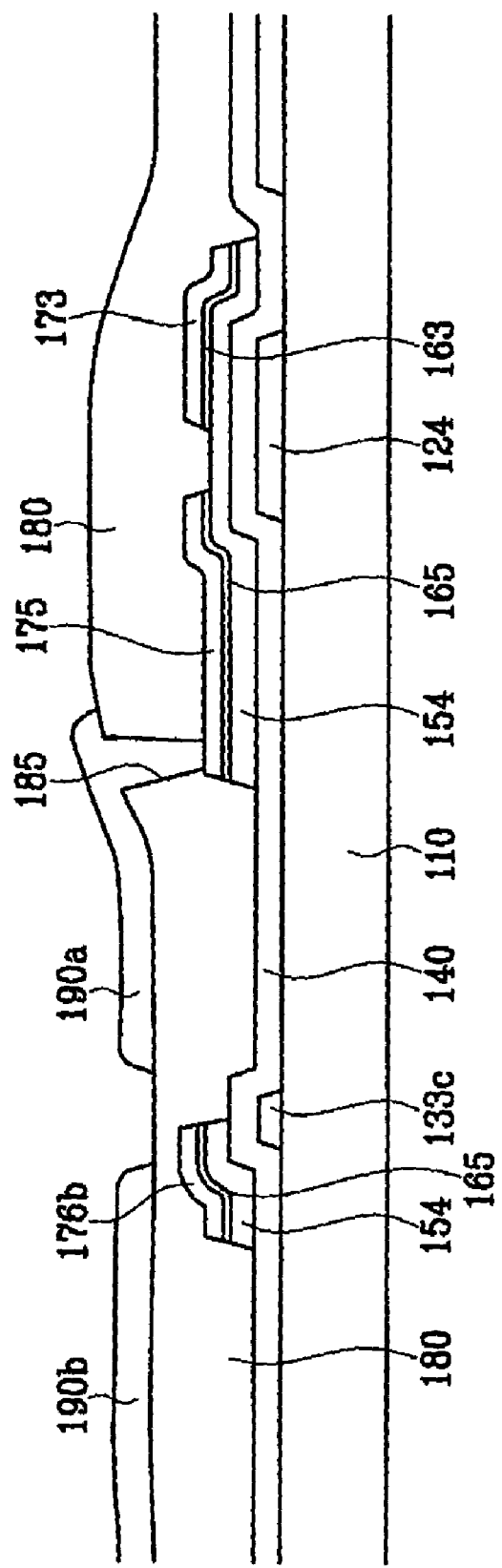
FIG. 12 is a sectional view of an LCD including the TFT array panel shown in FIG. 11 taken along the line XII-XII'.

Referring to FIG. 11 and FIG. 12, layered structures of the TFT panel 100 according to this embodiment are substantially the same as those shown in FIG. 7 and FIG. 8.

Referring to FIG. 11 and FIG. 12, the semiconductor stripes 151 have substantially the same planar shapes as the data lines 171, the drain electrodes 175, and the underlying ohmic contacts 161 and 165. However, the semiconductor stripes 151 include exposed portions, which are not covered with the data lines 171 and the drain electrodes 175, such as portions located between the source electrodes 173 and the drain electrodes 175.

In an LCD according to at least the above described embodiments of the present invention, lateral visibility of memory colors which affect much on color tone of human perception is improved. Accordingly, according to the invention an LCD displays a lateral angle color tone that is substantially the same as a front color tone and has a high transmittance.

Although several embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

In particular, cutouts in the pixel and common electrodes may be rearranged in various ways and shapes.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   an insulating substrate;
   a plurality of first signal lines formed on the insulating substrate;
   a plurality of second signal lines crossing the first signal lines and insulated from the first signal lines;
   a plurality of thin film transistors coupled with the first signal lines and the second signal lines; and
   a plurality of pixels comprising a plurality of first sub-pixel electrodes coupled with the thin film transistors and a plurality of second sub-pixel electrodes capacitively coupled with the first sub-pixel electrodes,
   wherein
   pixels of the plurality of pixels comprise a red pixel, a green pixel and a blue pixel,
   the red pixel comprises a red first sub-pixel electrode and a red second sub-pixel electrode, the green pixel comprises a green first sub-pixel electrode and a green second sub-pixel electrode, and the blue pixel comprises a blue first sub-pixel electrode and a blue second sub-pixel electrode; and
   voltage ratios of the second sub pixel electrode with respect to the first sub-pixel electrode for each of the green pixel and the blue pixel are less than a voltage ratio of the second sub-pixel electrode with respect to the first sub-pixel electrode for the red pixel.

2. The liquid crystal display of claim 1, wherein the voltage ratio of the second sub-pixel electrode with respect to the first sub-pixel electrode for the green pixel is less than the voltage ratio of the second sub-pixel electrode with respect to the first sub-pixel electrode for blue pixel.

3. The liquid crystal display of claim 1, wherein the voltage ratio of the second sub-pixel electrode with respect to the first sub-pixel electrode for the red pixel is about 0.675 to about 0.725, wherein the voltage ratio of the second sub-pixel electrode with respect to the first sub-pixel electrode for the green pixel is about 0.600 to about 0.650, and wherein the voltage ratio of the second sub-pixel electrode with respect to the first sub-pixel electrode for the blue pixel is about 0.650 to about 0.700.

4. A thin film transistor array panel, comprising;
   an insulating substrate;
   a plurality of first signal lines formed on the insulating substrate;
   a plurality of second signal lines crossing the first signal lines and insulated from the first signal lines;
   a plurality of thin film transistors coupled with the first signal lines and the second signal lines; and
   a plurality of pixels comprising a plurality of first sub-pixel electrodes coupled with the thin film transistors, a plurality of coupling electrodes coupled with the thin film transistors, and a plurality of second sub-pixel electrodes overlapping the coupling electrodes,
   wherein:
   pixels of the plurality of pixels comprise a red pixel, a green pixel and a blue pixel,
   the red pixel comprises a red first sub-pixel electrode and a red second sub-pixel electrode, the green pixel comprises a green first sub-pixel electrode and a green second sub-pixel electrode, and the blue pixel comprises a blue first sub-pixel electrode and a blue second sub-pixel electrode; and
   an overlapping area of a first coupling electrode and a second coupling electrode of the plurality of coupling electrodes and each of the second sub-pixel electrodes for the green pixel and the blue pixel, respectively, are less than an overlapping area of a third coupling electrode of the plurality of coupling electrodes and the second sub-pixel electrode for the red pixel.

5. The thin film transistor array panel of claim 4, wherein the overlapping area of the first coupling electrode and the second sub-pixel electrode for the green pixel is less than the overlapping area of the second coupling electrode and the second sub-pixel electrode for the blue pixel.

6. A liquid crystal display, comprising:
   an insulating substrate;
   a plurality of first signal lines formed on the insulating substrate;
   a plurality of second signal lines crossing the first signal lines and insulated from the first signal lines;
   a plurality of thin film transistors coupled with the first signal lines and the second signal lines; and
   a plurality of pixels comprising a plurality of first sub-pixel electrodes coupled with the thin film transistors and a plurality of second sub-pixel electrodes capacitively coupled with the first sub-pixel electrodes,
   wherein:
   pixels of the plurality of pixels comprise a red pixel, a green pixel, and a blue pixel,
   the red pixel comprises a red first sub-pixel electrode and a red second sub-pixel electrode, the green pixel comprises a green first sub-pixel electrode and a green second sub-pixel electrode and the blue pixel comprises a blue first sub-pixel electrode and a blue second sub-pixel electrode; and
   ratios of an area of the second sub-pixel electrode with respect to an area of the first sub-pixel electrode for each of the green pixel and the blue pixel are less than a ratio of an area of the second sub pixel electrode with respect to the first sub-pixel electrode for the red pixel.

* * * * *